(12) United States Patent
Del Gatto et al.

(10) Patent No.: US 11,934,270 B2
(45) Date of Patent: Mar. 19, 2024

(54) WRITE COMMAND EXECUTION FOR DATA PROTECTION AND RECOVERY SCHEMES

(71) Applicant: Micron Technology, Inc., Boise, ID (US)

(72) Inventors: Nicola Del Gatto, Cassina de' Pecchi (IT); Marco Sforzin, Cernusco sul Naviglio (IT); Paolo Amato, Treviglio (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/831,433

(22) Filed: Jun. 2, 2022

(65) Prior Publication Data

US 2023/0393940 A1 Dec. 7, 2023

(51) Int. Cl.
*G06F 11/00* (2006.01)
*G06F 11/10* (2006.01)

(52) U.S. Cl.
CPC ................ *G06F 11/1096* (2013.01)

(58) Field of Classification Search
CPC .................................................. G06F 11/1096
USPC ....................................................... 714/1–57
See application file for complete search history.

(56) References Cited

U.S. PATENT DOCUMENTS

| | | | |
|---|---|---|---|
| 7,290,168 B1* | 10/2007 | DeKoning | H04L 45/24 714/5.11 |
| 9,116,832 B2 | 8/2015 | Grube et al. | |
| 10,613,934 B2 | 4/2020 | Kalos et al. | |
| 10,922,172 B2 | 2/2021 | Margetts | |
| 2002/0154543 A1* | 10/2002 | Conley | G11C 16/10 365/185.11 |
| 2008/0201630 A1* | 8/2008 | Ikeuchi | G06F 11/1076 714/801 |
| 2011/0296084 A1* | 12/2011 | Nango | G11C 16/08 711/E12.008 |
| 2014/0068319 A1* | 3/2014 | Daly | G11C 7/1006 711/E12.008 |
| 2014/0189421 A1* | 7/2014 | Werner | G06F 11/1044 714/6.21 |
| 2015/0058693 A1* | 2/2015 | Wilson | H03M 13/2909 714/758 |
| 2015/0278004 A1* | 10/2015 | Li | G06F 11/0787 714/6.11 |
| 2015/0339068 A1* | 11/2015 | Cudak | G06F 11/10 714/6.23 |
| 2016/0034371 A1* | 2/2016 | Oh | G11C 8/00 714/6.2 |
| 2016/0098330 A1* | 4/2016 | Mu | G06F 3/0619 714/6.23 |
| 2016/0188407 A1* | 6/2016 | Bronnikov | G06F 11/1076 714/766 |
| 2016/0188429 A1* | 6/2016 | Noguchi | G06F 11/1068 714/6.21 |

(Continued)

*Primary Examiner* — Sarai E Butler
(74) *Attorney, Agent, or Firm* — Brooks, Cameron & Huebsch, PLLC

(57) ABSTRACT

One or more data blocks of a write command can be written to memory devices independently of other data blocks that are grouped together for an error correction operation with the data blocks. Further, data blocks of different write commands can be executed together and simultaneously rather than being executed separately at different times, which can reduce the latencies associated with executing the write commands.

20 Claims, 8 Drawing Sheets

(56) References Cited

U.S. PATENT DOCUMENTS

2017/0147229 A1\* 5/2017 Kingdon ................. G06F 3/067
2020/0117538 A1\* 4/2020 Singidi ................. G06F 3/0619

\* cited by examiner

WRITE COMMAND EXECUTION FOR DATA PROTECTION AND RECOVERY SCHEMES

TECHNICAL FIELD

The present disclosure relates generally to semiconductor memory and methods, and more particularly, to apparatuses, systems, and methods related to write command execution for data protection and recovery schemes.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Figure 1:
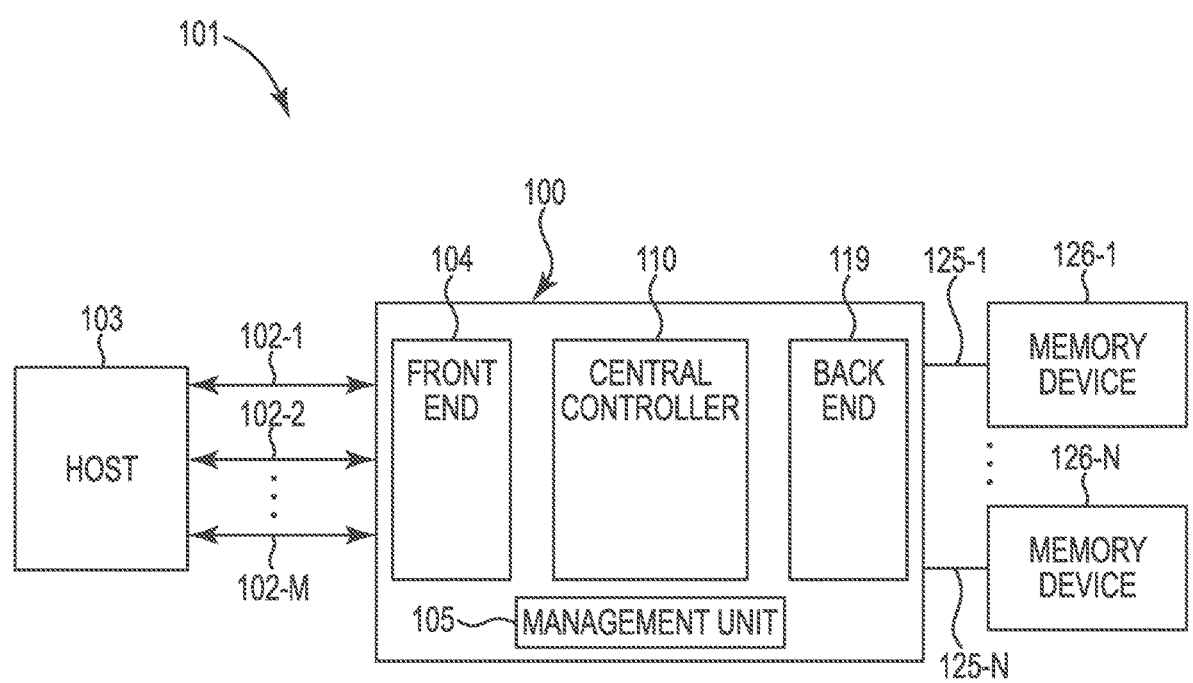
FIG. 1 is a functional block diagram of a computing system including a memory controller in accordance with a number of embodiments of the present disclosure.

Systems, apparatuses, and methods related to write command execution for data protection and recovery schemes are described. Data protection and recovery schemes are often an important aspect of RAS (Reliability, Availability, and Serviceability) associated with memory systems. Such schemes may provide a "chip kill", in which the memory system can work properly even if a constituent chip, such as a memory die, is damaged; thereby, avoiding a situation of one of the chips being a single point of failure (SPOF) of the memory system. Often, the chip kill capability is provided through various error correction code (ECC) schemes including a "Redundant Array of Independent Disks" (RAID) scheme, a low-power chip kill (LPCK) scheme, etc., which allow data recovery of the damaged chip by reading all of the constituent chips of the memory system.

The chip kill can involve ECC data (e.g., RAID parity or LPCK parity) that are specifically designed for data recovery of the damaged chip. The ECC data and user data that share the same ECC data can be referred to as being grouped together (e.g., across multiple memory devices or channels in a form of a codeword and/or a stripe). Alternatively speaking, a codeword and/or a stripe can include the user data and the ECC data shared by the user data.

Often, a chunk of data including at least one codeword and/or stripe and that are distributed across different chips can be a unit of read and write accesses such that subsets of the chunk are always read or written together. For example, writing new data to replace one of the subsets can be accomplished by reading the chunk, updating the ECC data of the chunk to conform to the new data, and writing the chunk with the replaced subset back to the chips. Such an ECC scheme, however, can sometimes be inefficient as the other subsets (other than the replaced subset) that do not include any changes to constituent bits are also read/written back. Further, the ECC data can be often stored in a dedicated channel, which makes combining subsets of different chunks to be simultaneously written to the memory devices difficult/impossible because the ECC data of different subsets may not be simultaneously written to the same dedicated channel.

In contrast, embodiments described herein are directed to a data protection scheme that involves independent execution of write commands, such as host write commands. In a number of embodiments, for example, each subset of a chunk including one or more codewords can be a unit of write access (instead of the chunk itself being a unit of write access), which allows the subset containing new data to be written to the chip without writing the other subsets back to the chips together with the subset. Accordingly, various embodiments described herein can spare resources of the memory system by avoiding unnecessary write accesses. Further, parity rotation can be implemented on the memory system of the embodiments described herein such that ECC data of different chunks can be communicated via different channels (e.g., stored in memory devices coupled to different channels), which allows the resources that are spared from avoiding the chunk being a unit of write access to be utilized for other host write commands as well. In some embodiments, for example, the spared resources can be utilized to execute the other host write commands, while the first host write command is being executed.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. It is to be understood that data can be transmitted, received, or exchanged by electronic signals (e.g., current, voltage, etc.) and that the phrase "signal indicative of [data]" represents the data itself being transmitted, received, or exchanged in a physical medium.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Analogous elements within a Figure may be referenced with a hyphen and extra numeral or letter. See, for example, elements 102-1, 102-2, 102-M in FIG. 1. Such analogous elements may be generally referenced without the hyphen and extra numeral or letter. For example, elements 102-1, 102-2, 102-M may be collectively referenced as elements 102. As used herein, the designators "M" and "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a functional block diagram of a computing system 101 including a memory controller 100 in accordance with a number of embodiments of the present disclosure. The memory controller 100 can include a front end portion 104, a central controller portion 110, and a back end portion 119. The computing system 101 can include a host 103 and memory devices 126-1, . . . , 126-N coupled to the memory controller 100.

The front end portion 104 includes an interface and interface management circuitry to couple the memory controller 100 to the host 103 through input/output (I/O) lanes 102-1, 102-2, . . . , 102-M and circuitry to manage the I/O lanes 102. There can be any quantity of I/O lanes 102, such as eight, sixteen, or another quantity of I/O lanes 102. In some embodiments, the I/O lanes 102 can be configured as a single port.

In some embodiments, the memory controller 100 can be a compute express link (CXL) compliant memory controller. The host interface (e.g., the front end portion 104) can be managed with CXL protocols and be coupled to the host 103 via an interface configured for a peripheral component interconnect express (PCIe) protocol. CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface.

The central controller portion 110 can include and/or be referred to as data management circuitry. The central controller portion 110 can control, in response to receiving a request from the host 103, performance of a memory operation. Examples of the memory operation include a read operation to read data from a memory device 126 or a write operation to write data to a memory device 126.

The central controller portion 110 can generate error detection information and/or error correction information based on data received from the host 103. The central controller portion 110 can perform error detection operations and/or error correction operations on data received from the host 103 or from the memory devices 126. An example of an error detection operation is a cyclic redundancy check (CRC) operation. CRC may be referred to as algebraic error detection. CRC can include the use of a check value resulting from an algebraic calculation using the data to be protected. CRC can detect accidental changes to data by comparing a check value stored in association with the data to the check value calculated based on the data. An example of an error correction operation is a chip kill operation, such as an LPCK operation and the error correction information can include LPCK parity, among others.

The back end portion 119 can include a media controller and a physical (PHY) layer that couples the memory controller 100 to the memory devices 126. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can include channels 125-1, . . . , 125-N. The channels 125 can include various types data buses, such as a sixteen-pin data bus and a two-pin data mask inversion (DMI) bus, among other possible buses.

An example of the memory devices 126 is dynamic random access memory (DRAM) operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). In at least one embodiment, at least one of the memory devices 126-1 is operated as an LPDDRx DRAM device with low-power features enabled and at least one of the memory devices 126-N is operated an LPDDRx DRAM device with at least one low-power feature disabled. In some embodiments, although the memory devices 126 are LPDDRx memory devices, the memory devices 126 do not include circuitry configured to provide low-power functionality for the memory devices 126 such as a dynamic voltage frequency scaling core (DVFSC), a sub-threshold current reduce circuit (SCRC), or other low-power functionality providing circuitry. Providing the LPDDRx memory devices 126 without such circuitry can advantageously reduce the cost, size, and/or complexity of the LPDDRx memory devices 126. By way of example, an LPDDRx memory device 126 with reduced low-power functionality providing circuitry can be used for applications other than mobile applications (e.g., if the memory is not intended to be used in a mobile application, some or all low-power functionality may be sacrificed for a reduction in the cost of producing the memory).

Data can be communicated between the back end portion 119 and the memory devices 126 in forms of a memory transfer block and/or data blocks. The term "data block" refers to a group of data bits that are communicated (e.g., read and/or written) together over a (e.g., predefined) burst length (e.g., a 32-bit burst length "BL") that a memory controller 100 operates with via a single channel 125.

A burst (having a burst length) is a series of data transfers over multiple cycles, such as beats. For example, 32-bit burst length can be made up of 32 beats of data transfers. In an example embodiment, each channel 125 can be made up of 8 DQs such that 8 bits are transferred for each beat of the burst length, causing 16 bits to be transferred at a time (e.g., per each beat of the burst length) to and/or from the memory devices 126.

The term "memory transfer block" refers to a group of data blocks that are communicated (e.g., read and/or written) together over a burst length (e.g., a 32-bit BL) that a memory controller 100 operates with via the channels 125. The data block can be a user data block containing host data (e.g., data received from the host 103 and alternatively referred to as user data) or a parity data block containing error correction information configured for a chip kill operation on user data blocks grouped together with the parity data block. Further, as used herein, a set of data blocks can refer to data blocks (e.g., user/parity data blocks) that are grouped together. As used herein, user data blocks that share the same parity data block can be referred to as being grouped together (along with the parity data block) for an error correction operation, such as a chip kill operation (e.g., LPCK operation). Accordingly, the user data blocks and the parity data block that are grouped together can be read together for a chip kill operation, such as an LPCK operation.

The host data or the error correction information of a single user data block can correspond to multiple codewords that are transferred over a predefined burst length. As an example, data transferred to and/or from each memory device 126 in each beat of a 32-bit BL can correspond to 4 codewords, which result in a single data block (e.g., user data block and/or parity data block) including data corresponding to 128 codewords (e.g., 32BL*4 codewords/beat=128 codewords) transferred to and/or from each memory device 126 over a 32-bit BL. In some embodiments, the error correction information can be parity data configured for a chip kill operation, such as an LPCK operation.

The memory devices 126 can be configured for (alternatively referred to as "configured to store") parity data blocks in various manners. In one example, one of the memory devices 126 can be configured for the parity data blocks. In another example, the parity data blocks can be distributed (e.g., evenly) across the memory devices 126. As an example, each memory device 126 can be configured for a single parity data block such that no more than a single parity data block is stored in each memory device 126.

In some embodiments, data blocks that are grouped together can be a unit of read access. For example, even when a host read command (e.g., read command received from the host 103) is received to read just one of the data blocks, all the data blocks that are grouped together can be read to the memory controller 100. As described further herein, the data blocks that are read together can be used for a chip kill operation at the memory controller 100 and just the data block requested by the host write command can be further sent to the host 103. In some embodiments, each one of the data blocks that are grouped together can be a unit of write access. Alternatively speaking, each data block can be individually written to the memory devices 126 without being written together with the other data blocks that are grouped together.

In some embodiments, the memory controller 100 can include a management unit 105 to initialize, configure, and/or monitor characteristics of the memory controller 100. The management unit 105 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

Figure 2:
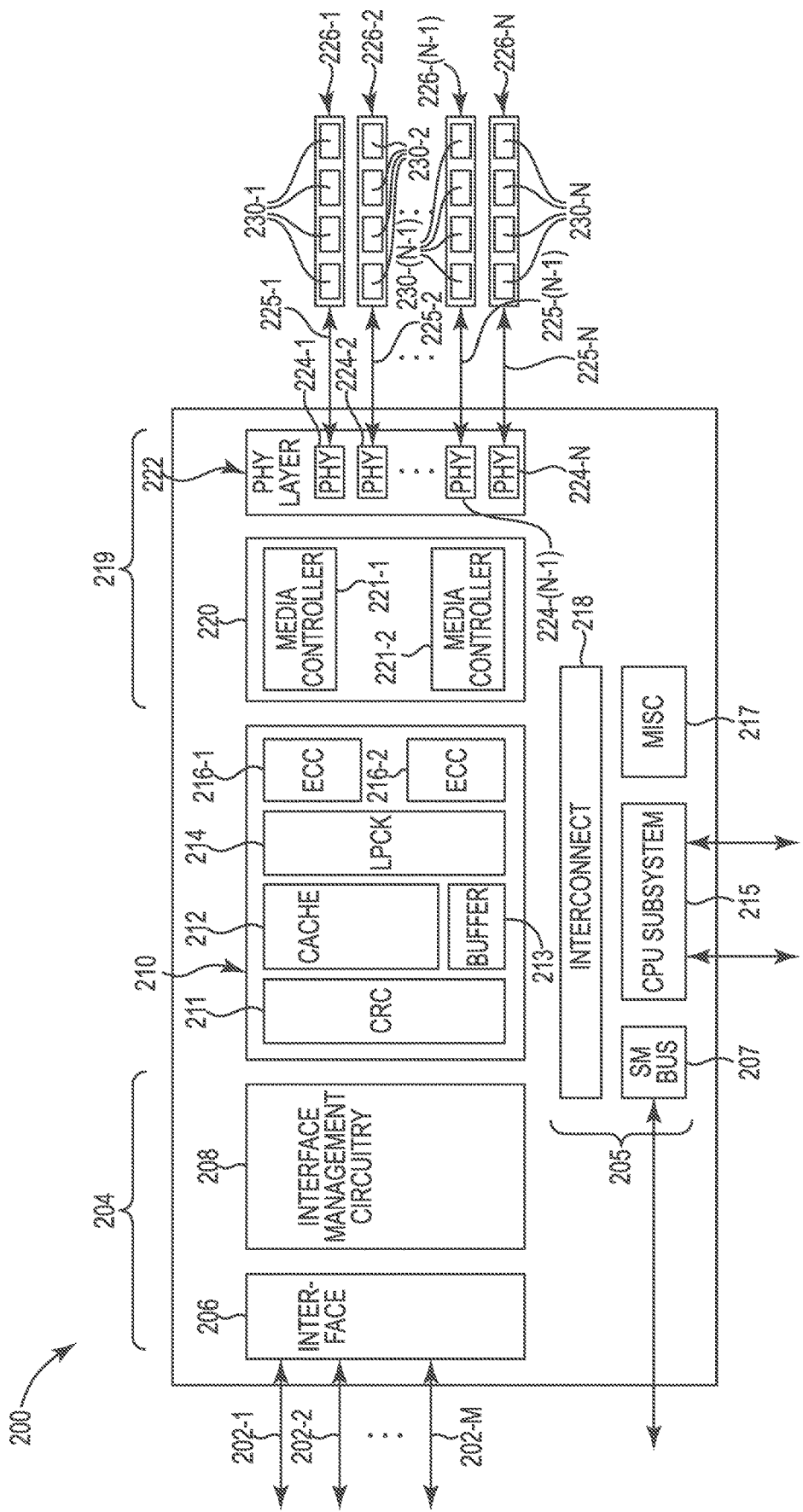
FIG. 2 is a functional block diagram of a memory controller having a first configuration in accordance with a number of embodiments of the present disclosure.

FIG. 2 is a functional block diagram of a memory controller 200 having a first configuration in accordance with a number of embodiments of the present disclosure. As shown in FIG. 2, a front end portion 204 can include an interface 206, which includes multiple I/O lanes 202-1, 202-2, . . . , 202-M, as well as interface management circuitry 208 to manage the interface 206. An example of the interface 206 is a peripheral component interconnect express (PCIe) 5.0 interface. In some embodiments, the memory controller 200 can receive access requests involving at least one of the cache memory 212 and the memory devices 226-1, 226-2, . . . , 226-(N-1), 226-N via the interface 206 according to a CXL protocol. The interface 206 can receive data from a host (e.g., the host 103 shown in FIG. 1) through the of I/O lanes 202. The interface management circuitry 208 may use CXL protocols to manage the interface 206 and may be referred to as CXL interface management circuitry 208. The CXL interface management circuitry 208 can be coupled to a host via the PCIe interface 206.

Data management circuitry 210 can be coupled to the interface management circuitry 208. The data management circuitry 210 can be configured to cause performance of a memory operation. The data management circuitry 210 can include at least one of error detection circuitry 211 (e.g., "CRC circuitry") and error correction circuitry 216. The error detection circuitry 211 can be configured to perform error detection operations on data. For example, the error detection circuitry 211 can be configured to generate a check value resulting from an algebraic calculation on data received from the interface management circuitry 208 and to transmit the check value to at least one of the cache memory 212, buffer 213, and media control circuitry 220. The check value can be referred to as CRC data or error detection data.

For some approaches to LPDDRx memory, the check value would be stored with the data (user data) in the memory device 226 in blocks within a same DRAM row as the user data. This reduces the overall capacity of the memory device 226 to store user data. For LPDDRx memory, such an approach leads to read amplification, where for a host read, the requested data is read from the memory device 226 and the corresponding check value is also read from the memory device. The data can be accessed in a 32-byte granularity and the CRC data can be accessed as 16 bytes, causing a read amplification factor of 1.5. However, according to at least one embodiment of the present disclosure, the LPDDRx memory is modified such that the DRAM row is extended to account for the CRC data, such that a host read in a 32-byte granularity yields the requested read data and the corresponding CRC data without requiring an additional read, thereby yielding a read amplification factor of 1 (e.g., zero amplification).

In at least one embodiment, the error detection circuitry is configured to perform an error detection operation on data received from the interface management circuitry prior to the data being cached and/or operated on by the error correction circuitry 216. Another example of an error detection operation is to generate a check value resulting from an algebraic calculation on data received from the media control circuitry and a comparison of that check value with a check value received from the media control circuitry 220 to determine whether the data includes an error (e.g., if the two check values are not equal).

The data management circuitry 210 can include a cache memory 212 to store data, error detection information, error correction information, and/or metadata associated with performance of the memory operation. An example of the cache memory 212 is a thirty two (32) way set-associative cache memory including multiple cache lines. The cache line size can be equal to or greater than the memory controller 200 access granularity (e.g., 64 bytes for a CXL protocol). For example, each cache line can include 256 bytes of data. In another example, each cache line can include 512 bytes of data. Read and write requests of CXL memory systems can be 64 bytes in size. Therefore, data entries in the cache memory 212 can have 64 bytes of data. Each cache line can comprise 256 bytes. Therefore, multiple 64-byte requests can be stored in each cache line. In response to a request from the host, the memory controller 200 can write 256 bytes of data to a memory device 226. In some embodiments, the 256 bytes of data can be written in user data blocks, which can respectively be 64-byte chunks. Use of the cache memory 212 to store data associated with a read operation or a write operation can increase a speed and/or efficiency of accessing the data because the cache memory 212 can prefetch the data and store the data in multiple 64-byte blocks in the case of a cache miss. Instead of searching a separate memory device in the event of a cache miss, the data can be read from the cache memory 212. Less time and energy may be used accessing the prefetched data than would be used if the memory system has to search for the data before accessing the data.

The data management circuitry 210 can include a buffer 213 to store data, error detection information, error correction information, and/or metadata subject to an operation thereon by another component of the data management circuitry 210 (e.g., the error detection circuitry 211, the error correction circuitry 216, and the low-power chip kill circuitry 214). The buffer 213 can allow for the temporary storage of information, for example, while another component of the data management circuitry 210 is busy. In some embodiments, the cache memory 212 can be used to temporarily store data and the buffer 213 can be used to temporarily store other information associated with the data, such as error detection information, error correction information, and/or metadata.

The data management circuitry can include low-power chip kill (LPCK) circuitry 214 coupled between the error detection circuitry 211 and the error correction circuitry 216. The LPCK circuitry 214 can be configured to perform operations associated with parity data, such as providing a chip kill protection and/or updating the parity data based on new host data. In some embodiments, the chip kill protection provided to the memory devices 226 can be an LPCK. The LPCK protection against any single memory device 226 (chip) failure and/or multi-bit error from any portion of a single memory chip can be implemented collectively across subsets of the memory devices 226 (e.g., LPCK can be provided for a first subset of the memory devices 226-1, 226-2 and separately for a second subset of the memory devices 226-(N-1), 226-N) or across all of the memory devices 226.

An example chip kill implementation for a memory controller 200 including an eleven channel 225 bus having a width of 176 bits coupled to eleven memory devices 226 can include writing data to eight of the eleven memory devices 226 and parity data to three of the eleven memory devices 226. Four codewords can be written, each composed of eleven four-bit symbols, with each symbol belonging to a different memory device 226. A first codeword can comprise the first four-bit symbol of each memory device 226, a second codeword can comprise the second four-bit symbol of each memory device 226, a third codeword can comprise the third four-bit symbol of each memory device 226, and a fourth codeword can comprise the fourth four-bit symbol of each memory device 226. These four codewords respectively from the memory devices 226 can be (partially at least) communicated over a single beat of a predefined burst length, such as 32-bit BL, which results in total 128 codewords communicated over a 32-bit BL.

Figure 4:
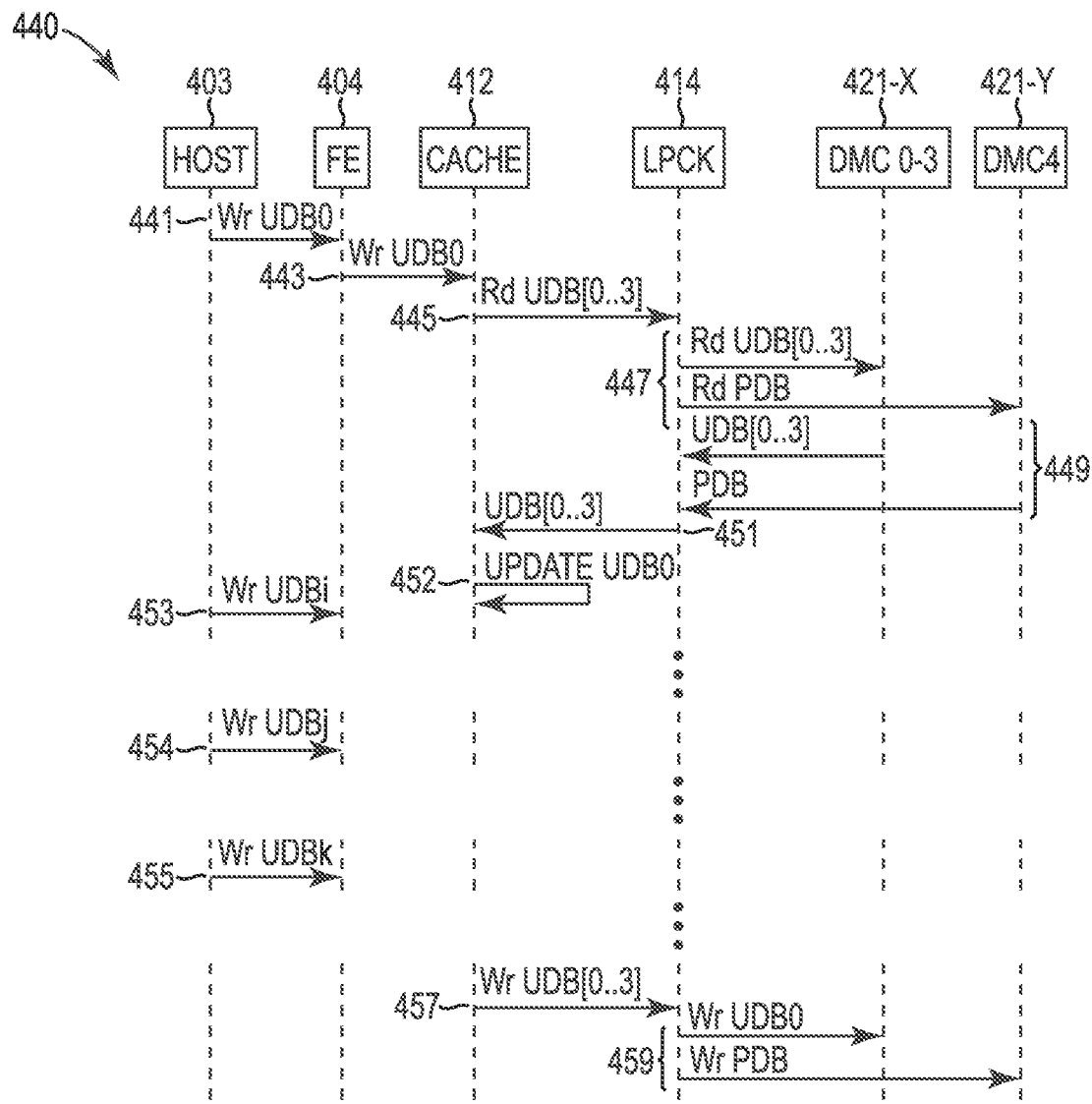
FIG. 4 is a timing diagram associated with executing host write commands in a cached architecture in accordance with a number of embodiments of the present disclosure.
Figure 5:
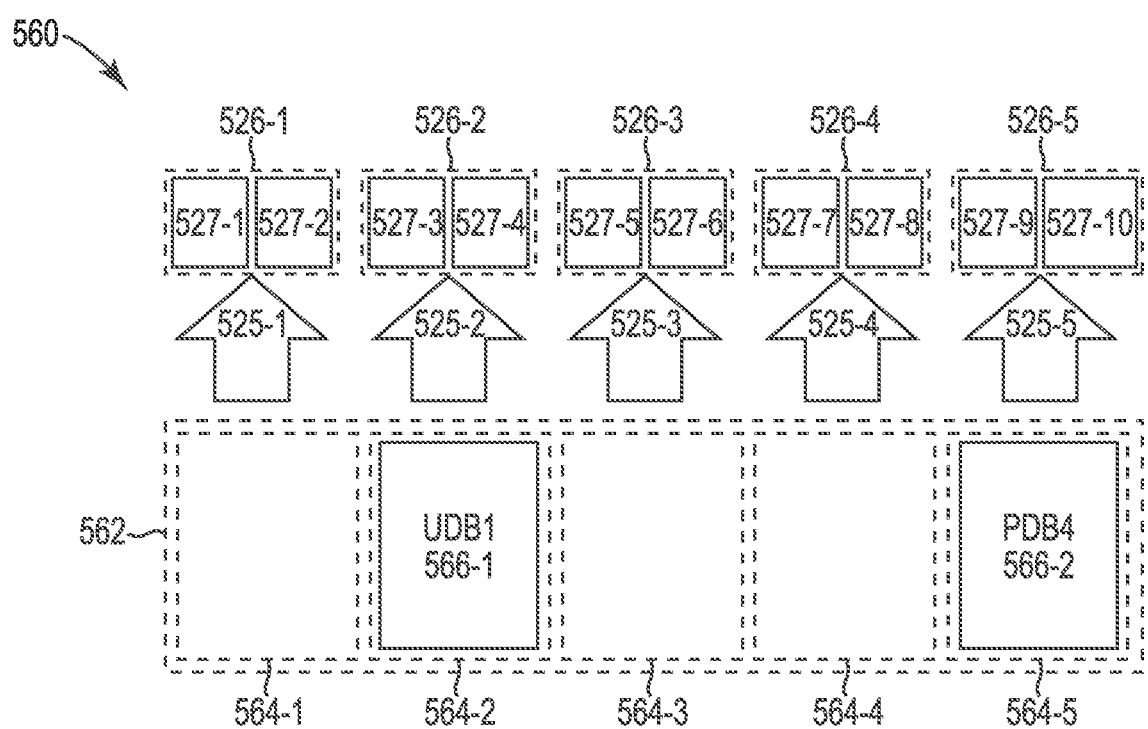
FIG. 5 is a block diagram associated with executing a write command in accordance with a number of embodiments of the present disclosure.

The three parity symbols can allow the LPCK circuitry 214 to correct up to one symbol error in each codeword and to detect up to two symbol errors. If instead of adding three parity symbols, only two parity symbols are added, the LPCK circuitry 214 can correct up to one symbol error but only detect one symbol error. In some embodiments, the data symbols and the parity symbols can be written or read concurrently from the memory devices 226. If every bit symbol in a die fails, only the bit symbols from that memory device 226 in the codeword will fail. This allows memory contents to be reconstructed despite the complete failure of one memory device 226. LPCK is considered to be "on-the-fly correction" because the data is corrected without impacting performance by performing a repair operation. In contrast, a redundant array of independent disks (RAID), described in more detail with respect to FIGS. 4-5, is considered to be "check-and-recover correction" because a repair process is initiated to recover data subject to an error. The LPCK circuitry 214 can include combinational logic that uses a feedforward process.

The LPCK circuitry 214 can further update the parity symbols in association with execution of host write commands. For example, the LPCK circuitry 214 can receive data symbols (e.g., containing user data and/or host data received from the host 103 illustrated in FIG. 1) that are received from the host and as part of the hot write commands, retrieve corresponding parity symbols (e.g., one or more parity symbols), and update the parity symbols based on the data symbols.

The updated parity symbols can be written back to the memory devices 226 along with the data symbols received as part of the host write commands. The data symbols and/or parity symbols can be communicated between the memory controller 200 and the memory devices 226 in forms of data blocks. As used herein, the term "parity data block" refers to a data block containing one or more parity symbols and the term "user data block" (alternatively referred to as "host data block" also) refers to a data block containing one or more data symbols.

As shown in FIG. 2, the data management circuitry 210 can include error correction circuitry 216-1, 216-2 configured to perform error correction operations on the data (e.g., ECC encode the data and/or ECC decode the data). The error correction circuitry 216 can be coupled to the error detection circuitry 211 for embodiments (not specifically illustrated) that do not include the cache 212, buffer 213, or LPCK circuitry 214. Otherwise, the error correction circuitry 216 can be coupled to any of the cache 212, buffer 213, or LPCK circuitry 214 (as illustrated in FIG. 2). Although two error correction circuits 216 are illustrated, embodiments are not so limited. Embodiments can include only one error correction circuit 216 or more than two error correction circuits 216 in the data management circuitry 210. In at least one embodiment, the memory controller 200 can include an equal quantity of error correction circuits 216-1, 216-2 as media controllers 221-1, 221-2. In at least one embodiment, the data can be protected by the error detection circuitry 211, the LPCK circuitry 214, and the error correction circuitry 216 before being written to the memory devices 226.

As shown in FIG. 2, the memory controller 200 can include a back end portion 219 including a media control circuitry 220 coupled to the data management circuitry 210. The media control circuitry 220 can include media controllers 221-1, 221-2. The back end portion 219 can include a physical (PHY) layer 222 having PHY memory interfaces 224-1, 224-2, . . . , 224-(N-1), 224-N. Each physical interface 224 is configured to be coupled to a respective memory device 226. The PHY layer 222 can be an LPDDRx memory interface.

The back end portion 219 can couple the PHY layer portion 222 to memory banks 230-1, 230-2, . . . , 230-(N-1), 230-N of memory devices 226-1, 226-2, . . . , 226-(N-1), 226-N. The memory devices 226 each include at least one array of memory cells. In some embodiments, the memory devices 226 can be different types of memory. The media control circuitry 220 can be configured to control at least two different types of memory. For example, the memory devices 226-1, 226-2 can be LPDDRx memory operated according to a first protocol and the memory devices 226-(N-1), 226-N can be LPDDRx memory operated according to a second protocol different from the first protocol. In such an example, the first media controller 221-1 can be configured to control a first subset of the memory devices 226-1, 226-2 according to the first protocol and the second media controller 221-2 can be configured to control a second subset of the memory devices 226-(N-1), 226-N according to the second protocol. In a specific example, the memory devices 226-1, 226-2 may have on board error correction circuitry.

In some embodiments including different subsets of the memory devices 226 operated according to different protocols, the data management circuitry 210 can selectively enable the error correction circuitry 216 based on the type of memory device 226 being operated. For example, the data management circuitry can disable the error correction circuitry 216-1 for the first subset of memory devices 226-1, 226-2 that have their own error correction circuitry and enable the error correction circuitry 216-2 for the second subset of memory devices 226-(N-1), 226-N that do not have on board error correction circuitry. Such embodiments advantageously allow the memory controller 200 to be designed and fabricated generically for a wider range of memory 226 to be controlled and allow the memory controller 200 to be able to contemporaneously control different types of memory operated according to different protocols.

In some embodiments including different subsets of the memory devices 226 being operated according to different protocols, the memory controller 200 can be configured to disable at least one low-power feature with respect to the first subset of memory devices 226-1, 226-2 and to enable the at least one low-power feature with respect to the second subset of memory devices 226-(N-1), 226-N. Examples of such low-power features include a DVFSC of the memory devices 226 and a SCRC of the memory devices 226. The SCRC can reduce the sub-threshold current, which is useful particularly for memory used in mobile applications. The DVFSC, when enabled, (e.g., by mode registers) allows low-power DRAM to operate internal circuitry from either a high or low voltage rail, depending on the operating frequency. The memory device 226 can internally switch some internal circuits from one rail to the other. However, some memory operations may take longer to completed when the DVFSC is enabled. In some embodiments, only those low-power features that are not supported by the CXL protocol are disabled.

Although not specifically illustrated, for some embodiments including LPCK circuitry 214, the media controller circuitry 220 can include a single media controller 221. When implementing chip kill, the channels 225-1, 225-2, . . . , 225-(N-1), 225-N can be driven concurrently to write data to the memory devices 226. However, in some embodiments, instead of using a single media controller 221, multiple media controllers 221-1, 221-2 can be used to drive the channels 225 in the LPCK architecture. When multiple media controllers 221 are used to drive the channels 225 concurrently, the media controllers 221 are utilized substantially contemporaneously. In at least one embodiment, each of the media controllers 221 can receive a same command and address and drive the channels 225 substantially contemporaneously. By using the same command and address, each of the media controllers 221 can utilize the channels 225 to perform the same memory operation on the same memory cells.

As used herein, the term "substantially" means that the characteristic need not be absolute, but is close enough so as to achieve the advantages of the characteristic. For example, "substantially contemporaneously" is not limited to operations that are performed absolutely contemporaneously and can include timings that are intended to be contemporaneous but due to manufacturing limitations may not be precisely contemporaneously. For example, due to read/write delays that may be exhibited by various interfaces (e.g., LPDDR5 vs. PCIe), media controllers that are utilized "substantially contemporaneously" may not start or finish at exactly the same time. For example, the memory controllers can be utilized such that they are writing data to the memory devices at the same time regardless of whether one of the media controllers commences or terminates prior to the other.

The memory controller 200 can include a management unit 205 configured to initialize, configure, and/or monitor characteristics of the memory controller 200. In some embodiments, the management unit 205 includes a system management (SM) bus 207. The SM bus 207 can manage out-of-band data and/or commands. The SM bus 207 can be part of a serial presence detect. In some embodiments, the SM bus 207 can be a single-ended simple two-wire bus for the purpose of lightweight communication. The management unit 205 can include a CPU subsystem 215, which can function as a controller for the management unit to execute instructions associated with initializing, configuring, and/or monitoring the characteristics of the memory controller 200. The management unit 205 can include miscellaneous circuitry 217, such as local memory to store codes and/or data associated with managing and/or monitoring the characteristics of the memory controller 200. An endpoint of the management unit 205 can be exposed to the host system (e.g., the host 103 shown in FIG. 1) to manage data. In some embodiments, the characteristics monitored by the management unit 205 can include a voltage supplied to the memory controller 200 and/or a temperature measured by an external sensor. The management unit 205 can include an interconnect 218, such as an advanced high-performance bus (AHB) to couple different components of the management unit 205.

The management unit 205 can include circuitry to manage in-band data (e.g., data that is transferred through the main transmission medium within a network, such as a local area network (LAN)). In some embodiments, the CPU subsystem 215 can be a controller that meets the Joint Test Action Group (JTAG) standard and operate according to an Inter-Integrate Circuit (I²C or I³C) protocol, and auxiliary I/O circuitry. JTAG generally refers to an industry standard for verifying designs and testing printed circuity boards after manufacture. I²C generally refers to a serial protocol for a two-wire interface to connect low-speed devices like microcontrollers, I/O interfaces, and other similar peripherals in embedded systems. In some embodiments, the auxiliary I/O circuitry can couple the management unit 205 to the memory controller 200. Further, firmware for operating the management unit can be stored in the miscellaneous circuitry 217. In some embodiments, the miscellaneous circuitry 217 can be a flash memory such as flash NOR memory or other persistent flash memory device.

In a non-limiting example, an example apparatus (e.g., the computing system 101 illustrated in FIG. 1) can include a number of memory devices (e.g., the memory devices 126 and/or 226 illustrated in FIGS. 1-2, respectively) respectively coupled to a number of channels (e.g., the channels 125 and/or 225 illustrated in FIGS. 1 and 2) configured to store sets of data blocks each including respective user data blocks and one or more parity blocks that are grouped together for an error correction operation, such as a chip kill operation (e.g., LPCK operation). Each set of data blocks can be a unit of read access. The example apparatus can further include a controller (e.g., the memory controller 100 illustrated in FIG. 1) coupled to the number of memory devices. The controller can be configured to receive a write command (e.g., a host write command from the host 103 illustrated in FIG. 1) to write a first user data block corresponding to a first set of user data blocks to a first location of the number of memory devices. The controller can be further configured to retrieve, in response to receipt of the write command, respective data blocks corresponding to the first set from the number of memory devices. The controller can be further configured to update the retrieved one or more parity blocks based at least in part on the first user data block. The controller can be further configured to write the first user data block and the updated one or more parity data blocks to corresponding memory devices of the number of memory devices independently of the other data blocks of the first set.

In some embodiments, the first write command can be one of a plurality of write commands to write respective user data blocks to the number of memory devices. In this example, the controller can be configured to select write commands of the plurality having user data blocks and respective parity data blocks targeting different memory devices of the number of memory devices. Further, the controller can be configured to write the user data blocks and the respective parity data blocks of the selected write commands to respective memory devices of the number of memory devices simultaneously.

In some embodiments, the controller can include a cache (e.g., the cache 212). In this example, the write command is to write the first user data block from the cache to a respective memory device of the number of memory devices to synchronize the cache and the respective memory device of the number of memory devices.

In some embodiments, each memory device of the number of memory device can be configured for a single parity data block such that parity data blocks of the sets are distributed across different memory devices of the number of memory devices. In some embodiments, each memory device of the number of memory device can be configured for a single user data block of each set of the sets of user data blocks such that user data blocks of each set are distributed across different memory devices of the number of memory devices. The controller can be configured to access one of the number of memory devices independently of and simultaneously with other memory devices of the number of memory devices.

In another non-limiting example, an example apparatus (e.g., the computing system 101 illustrated in FIG. 1) can include a number of memory devices (e.g., the memory devices 126 and/or 226 illustrated in FIGS. 1-2, respectively) respectively coupled to a number of channels (e.g., the channels 125 and/or 225 illustrated in FIGS. 1-2, respectively). The example apparatus can further include a controller (e.g., the memory controller 100 illustrated in FIG. 1) coupled to the number of memory devices. The controller can be configured to receive a number of write commands. The controller can be further configured to, responsive to receipt of the number of write commands, update parity data blocks respectively corresponding to user data blocks of the number of write commands. The controller can be further configured to select, among the number of write commands, write commands having user data blocks and respective parity data blocks targeting different memory devices among the number of memory devices. The controller can be further configured to write the user data blocks and the respective parity data blocks of the selected write commands to the different memory devices simultaneously.

In some embodiments, the controller can be configured to prevent from selecting, among the number of write commands, at least two write commands targeting a same memory device of the number of memory devices. In some embodiments, the user data blocks and the respective parity data blocks of the selected write commands can be written to the different memory devices as part of performance of a cache write back.

In some embodiments, the number of memory devices are configured for sets of data blocks. Each set can include data blocks that are grouped together for an error correction operation, such as a chip kill operation (e.g., LPCK operation) and can be a unit of read access. In this example, the user data blocks of the selected write commands correspond to different sets of data blocks. Further, in this example, parity data blocks of the sets of data blocks can be distributed across different memory devices of the number of memory devices.

Figure 3:
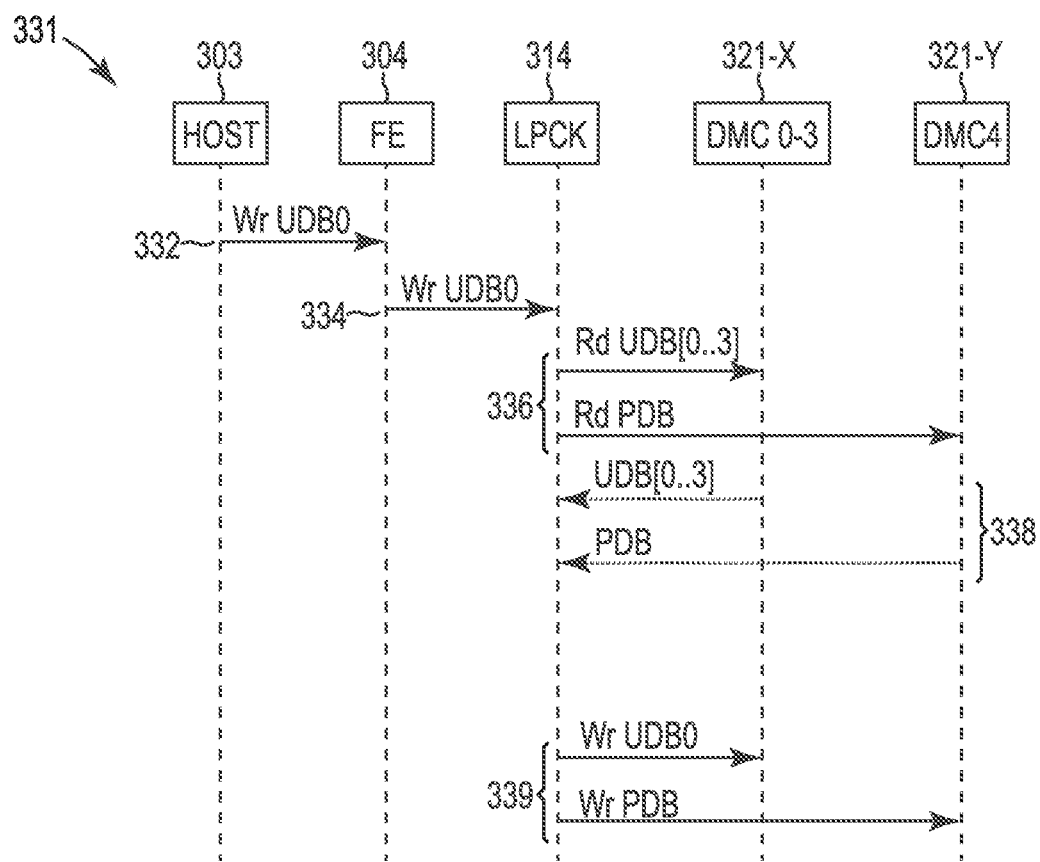
FIG. 3 is a timing diagram associated with executing host write commands in a non-cached architecture in accordance with a number of embodiments of the present disclosure.

FIG. 3 is a timing diagram 331 associated with executing host write commands in a non-cached architecture in accordance with a number of embodiments of the present disclosure. Although embodiments are not so limited, the example illustrated in FIG. 3 includes five media controllers (e.g., the media controllers 221 illustrated in FIG. 2) that can be respectively coupled to five memory devices, such as the memory devices 126 and/or 226 illustrated in FIGS. 1 and 2, respectively.

The media controller 321-X (e.g., four media controllers, such as "DMC 0-3" including DMC 0, DMC 1, DMC 2, and DMC 3) can represent one or more media controllers (e.g., the media controllers 221 illustrated in FIG. 2) coupled to one or more memory devices that are configured for a user data block. Further, the media controller 321-Y (e.g., a media controller, such as "DMC 4") can represent a media controller coupled to a memory device that is configured for a parity data block grouped with the user data block the media controllers 321-X is configured for.

At 332, a host write command ("Wr UDB0" shown in FIG. 3) to write a new user data block 0 (e.g., a user data block 0 containing new host data) to a particular location of memory devices (e.g., one of the memory devices 126 and/or 226 illustrated in FIGS. 1 and 2, respectively) is sent from the host 303 to the front end 304. At 334, the host write command is further sent from the front end 304 to the LPCK circuitry 314. In response to the host write command, the LPCK circuitry 314 generates memory read commands ("Rd UDB[0 . . . 3]" and "Rd PDB" shown in FIG. 3) to read constituent data blocks (e.g., user data blocks 0 to 3 and a parity block PDB) that are grouped together (e.g., with the user data block 0 that is to be replaced by the new user data block 0) from the memory devices. Over a period 336, the memory read commands are sent from the LPCK circuitry 314 to respective media controllers 321. For example, the memory read commands "Rd UDB[0 . . . 3]" are sent to the media controllers 321-X to read user data blocks and the memory read command "Rd PDB" is sent to the media controller 321-Y to read the parity data block.

Over a period 338, the constituent data blocks are retrieved to the LPCK circuitry 314. The LPCK circuitry 314 updates the retrieved parity data block based on the retrieved user data blocks 0 to 3 and the new user data block 0. Subsequent to updating the parity data block, the LPCK circuitry 314 generates memory write commands to write the new user data block 0 (instead of the user data block 0 retrieved from the memory devices) and the updated parity data block back to the respective memory devices.

These generated commands can be sent to respective media controllers over a period 339. For example, the memory write command to write the new user data block 0 can be sent to one of the media controllers 321-X (e.g., DMC 0 that is configured for the user data block 0) and the memory write command to write the updated parity block can be sent to the media controller 321-Y (e.g., DMC 4).

FIG. 4 is a timing diagram 440 associated with executing host write commands in a cached architecture in accordance with a number of embodiments of the present disclosure. At 441, a host write command ("Wr UDB0" shown in FIG. 4) to write a new user data block 0 (e.g., a user data block 0 containing new host data) can be sent from a host 403 to a front end 404. At 443, the host write command can be further sent from the front end 404 to a cache 412. In response to receiving the host write command, the cache 412 can generate memory read commands to read user data blocks (e.g., including an old user data block 0 stored in a location to which the new user data block 0 is to be written). At 445, the generated read commands can be sent from the cache 412 to LPCK circuitry 414. In response to receiving the read commands from the cache 412, the LPCK circuitry 414 can further generate memory read commands to read a parity data block that are grouped together with the user data blocks, such as the user data block 0. The memory read commands generated at the cache 412 and the LPCK circuitry 414 can be sent to respective media controllers (e.g., the media controllers 221 illustrated in FIG. 2) over a period 447.

Over a period 449, the user data blocks and the parity data block that are grouped together with the user data block 0 can be retrieved to the LPCK circuitry 414. The LPCK circuitry 414 can correct any errors on the user data blocks, such as the old user data block 0 (as well as on the parity data block) by performing a chip kill operation (e.g., LPCK operation) using the parity data block. The user data blocks 0 to 3 with any errors corrected can be further sent to the cache 412 at 451 (such that a subsequent access for any one of the user data blocks 0 to 3 can be performed at a cache-level with a cache hit). At 452, the user data block (e.g., UBD0) read from memory is replaced with the updated user data block (e.g., the new UDB0) in the cache 412.

As illustrated in FIG. 4, additional host write commands ("Wr UDBi", "Wr UDBj", and "Wr UDBk" shown in FIG. 4) are subsequently received respectively at 453, 454, and 455. At some point, the cache 412 can generate and send memory write commands to the LPCK circuitry 414 to perform a cache write back that synchronizes the cache 412 and the memory devices in association with the host write commands whose corresponding user data blocks have not been written to the memory devices yet.

At 457, the memory write commands to write the user data blocks 0 to 3 (e.g., including a dirty user data block, such as the new user data block 0 that has been stored in the cache 412, but not written to the memory devices yet) can be sent to the LPCK circuitry 414. In response to the memory write commands from the cache 412, the LPCK circuitry 414 updates a parity data block based on the user data blocks 0 to 3. The LPCK circuitry 414 further generates the memory write command to write the user data block 0 (e.g., a dirty user data block) and the updated parity data block, which can be sent to the respective media controllers 421-X and 421-Y at 459. The media controller 421-X (e.g., four media controllers, such as "DMC 0-3" including DMC 0, DMC 1, DMC 2, and DMC 3) can represent one or more media controllers (e.g., the media controllers 221 illustrated in FIG. 2) coupled to one or more memory devices that are configured for user data blocks. Further, the media controller 421-Y (e.g., a media controller, such as "DMC 4") can represent a media controller coupled to a memory device that is configured for a parity data block.

In some embodiments, the cache write back can be performed with dirty data blocks of multiple host write commands. For example, instead of writing just the dirty user data block 0 (and its corresponding parity data block) at 452, at least one of the user data blocks received at 453, 454, and 455 can be written back to the memory devices together with the dirty user data block 0. As further described herein, data blocks can be selected among the user data blocks received at 453, 454, and 455 (and their corresponding parity data blocks) based on respective memory devices the data blocks are to be written to. For example, if the dirty user data block 0 is targeting a memory device coupled to DMC 0 and the parity data block is targeting a memory device coupled to DMC 4, the data blocks that are selected to be written together with the dirty user data block 0 can be those data blocks targeting DMCs 1, 2, and/or 3.

FIG. 5 is a block diagram 560 associated with executing a write command in accordance with a number of embodiments of the present disclosure. As used herein, a memory transfer block can be a group of data blocks that can be transferred at a time to one or more memory devices 526 via channels 525. The memory devices 526 can include multiple dice (e.g., dice 527-1, . . . , 527-10 illustrated in FIG. 5), such as two dice as illustrated in FIG. 5. In some embodiments, data blocks 566 illustrated in FIG. 5 can be written to the memory devices 526 as part of performance of the cache write back.

The data buses can be operated with a burst length (e.g., a 32-bit burst length "BL"). A burst is a series of data transfers over multiple cycles, such as beats. For example, 32-bit burst length can be made up of 32 beats of data transfers. In an example embodiment, each channel 525 can be made up of 8 DQs such that 8 bits are transferred for each beat of the burst length, causing 16 bits to be transferred at a time (e.g., per each beat of the burst length) to and/or from the memory devices 526.

Memory transfer blocks (e.g., the memory transfer block 562 illustrated in FIG. 5) can include multiple slots, which may or may not be filled with data blocks (e.g., user data blocks and/or parity data blocks). For example, the memory transfer block 562 can include five slots (e.g., the slots 564-1, . . . , 564-5) each may be or may not be filled with a respective data block. In a number of embodiments, a quantity of slots of the memory transfer blocks can be determined (e.g., predetermined) based on a quantity of channels (e.g., the channels 125 and/or 225 illustrated in FIGS. 1 and 2, respectively) coupled between the memory controller (e.g., the memory controller 100 and/or 200 illustrated in FIGS. 1 and 2, respectively) and the memory devices 526. For example, if there are 5 channels coupled between the memory controller and the memory devices 526, the memory transfer block can have 5 slots.

As illustrated in FIG. 5, the memory transfer block is filled with two data blocks respectively at the slots 564-2 and 564-5. The data blocks at the slots 564-2 and 564-5 are associated with a single host write command. For example, the data block 566-1 can be a user data block containing new host data received as part of the host write command (e.g., the host 103 illustrated in FIG. 1) and the data block 566-2 can be a parity data block that is updated based at least in part on the host data of the data block 566-1. The other slots can remain empty (not filled with further data blocks). Accordingly, a write operation associated with the memory transfer block 562 can be performed by employing two out of five channels to carry the user data block 566-1 and the parity data block 566-2.

Figure 6:
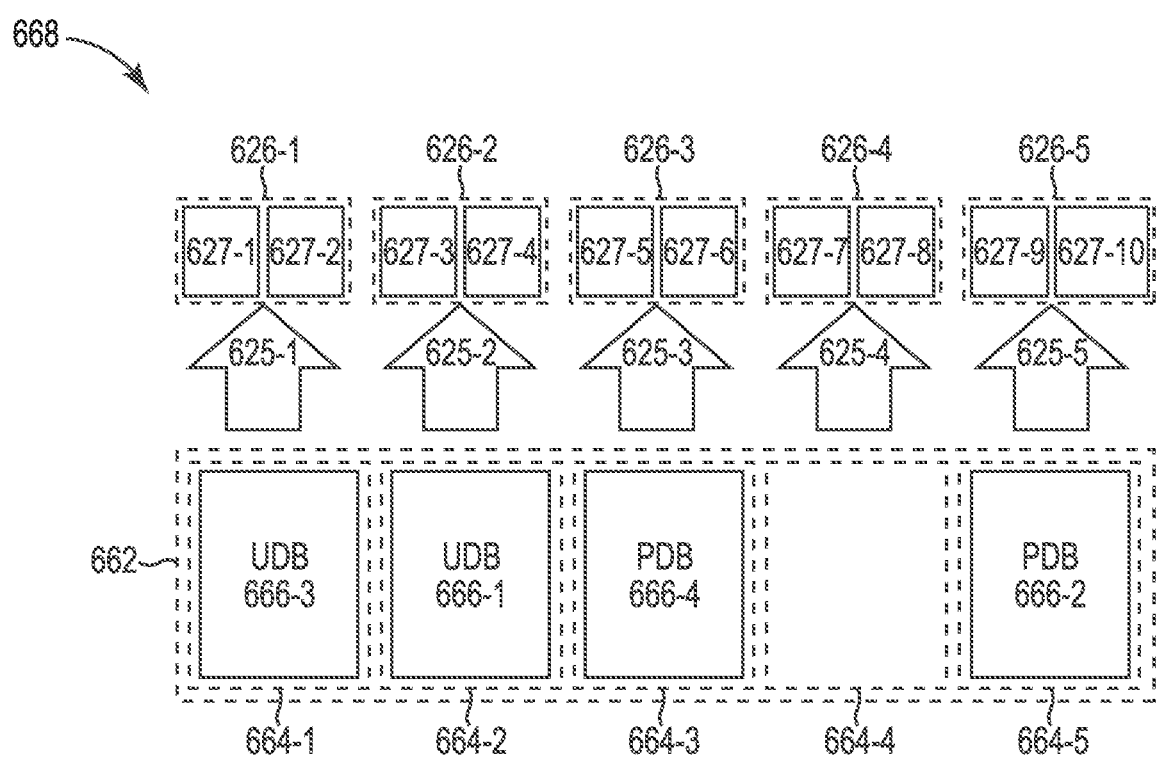
FIG. 6 is a block diagram associated with executing write commands selected in accordance with a number of embodiments of the present disclosure.

FIG. 6 is a block diagram 668 associated with executing write commands selected in accordance with a number of embodiments of the present disclosure. In some embodiments, data blocks 666 illustrated in FIG. 5 can be written to the memory devices 626 as part of performance of the cache write back.

The memory transfer block 662 illustrated in FIG. 6 can be analogous to the memory transfer block 562 illustrated in FIG. 5 except that the slots of the memory transfer block are filled with data blocks of different host write commands. For example, the slots 664-2 and 664-5 can be filled respectively with a user data block 666-1 ("UDB" shown in FIG. 6) and an updated parity data block 666-2 ("PDB" shown in FIG. 6) that are associated with a first host write command and the slots 664-1 and 664-3 can be filled respectively with a user data block 666-3 ("UDB" shown in FIG. 6) and an updated parity data block 666-4 ("PDB" shown in FIG. 6) that are associated with a second host write command. Those host write commands to be executed together (e.g., in a same memory transfer block) can be selected based on channels to carry respective data blocks. For example, two host write commands whose constituent data blocks are to be carried via a same channel may not be selected to be executed in a same memory transfer block. Accordingly, data blocks of one memory transfer block can be executed simultaneously despite of the data blocks being of different host write commands.

As illustrated in FIG. 6, each host write command involves at least two different data blocks, one being a user data block and the other one being a parity data block. Accordingly, the slot 664-4 can remain empty (e.g., not filled with further data blocks) because one slot is not sufficient for further data blocks of an additional host write command.

Figure 7:
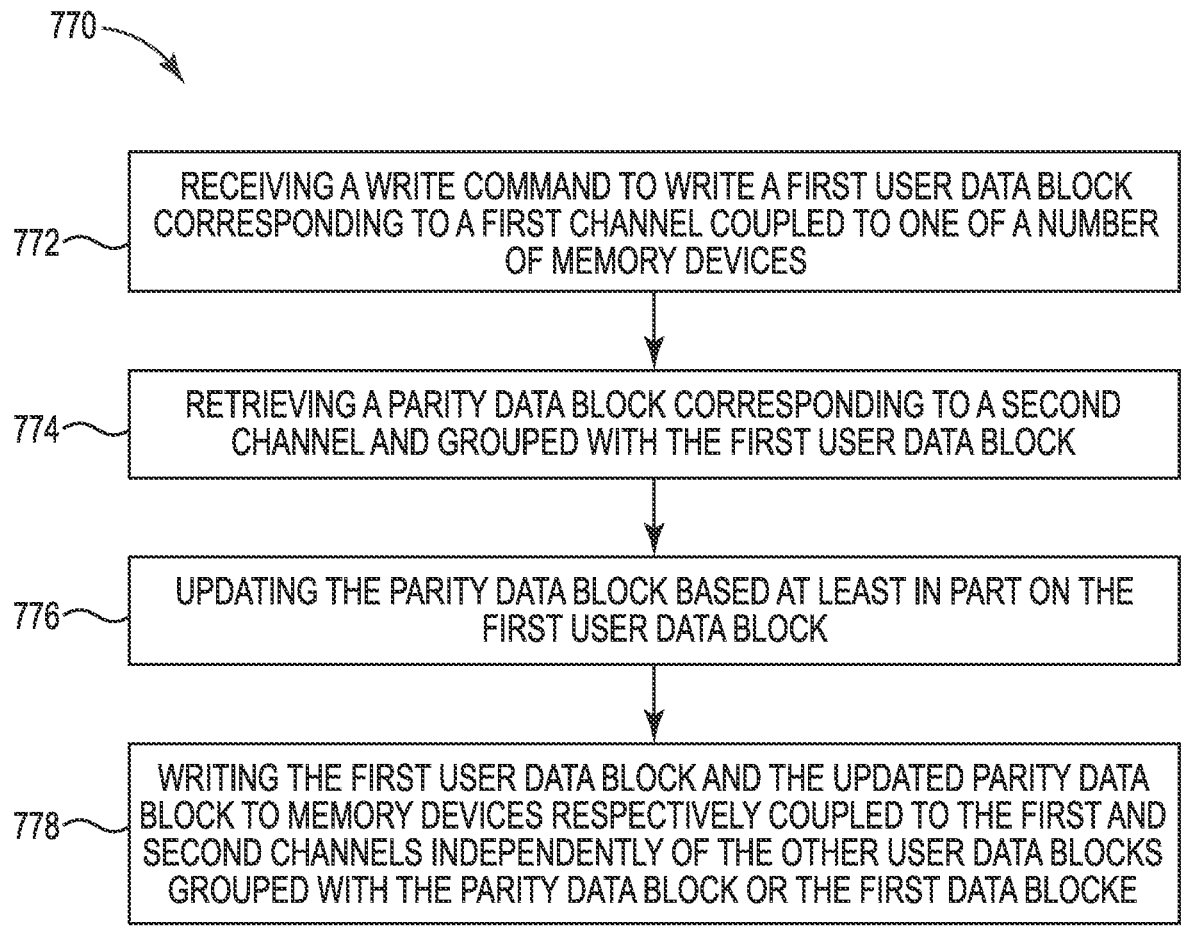
FIG. 7 is a flow diagram of a method for independent execution of write commands in accordance with a number of embodiments of the present disclosure.

FIG. 7 is a flow diagram 770 of a method for independent execution of write commands in accordance with a number of embodiments of the present disclosure. The method 770 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 770 is performed by the memory controller 100 and/or 200 illustrated in FIGS. 1 and 2, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 772, a write command (e.g., a host write command from the host 103 illustrated in FIG. 1) to write a first user data block (e.g., a user data block 566-1, 666-1, and/or 666-3 illustrated in FIGS. 5-6, respectively) that corresponds to a first channel coupled to one of a number of memory devices (e.g., the memory devices 126, 226, and/or 526 illustrated in FIGS. 1, 2, and 5, respectively) can be received. The first user data block can be one of set of data blocks that are grouped together and is a unit of read access. At 774, a parity data block (e.g., a parity data block 566-2, 666-2, and/or 666-4 illustrated in FIGS. 5-6, respectively) corresponds to a second channel and grouped with the first user data block can be retrieved from a second location of the number of memory devices responsive to the write command. At 776, the parity data block can be updated based at least in part on the first user data block. In some embodiments, the other user data blocks grouped with the parity data block or the first data block can also be retrieved from the number of memory devices and the parity data block can be updated based at least in part on the first user data block and the other user data blocks.

At 778, the first user data block and the updated parity data blocks can be written to the first location and the second location of the number of memory devices independently of the other user data blocks grouped with the parity data block or the first data block. For example, the first user data block and the updated parity data block can be written to the number of memory devices without writing the other user data blocks back to the number of memory devices.

In some embodiments, the write command can be a first write command. In this example, second write commands (e.g., host write commands from the host 103 illustrated in FIG. 1) can be received and write commands having user data blocks and corresponding parity data blocks targeting different locations than the first or the second location can be selected among the second write commands. The first user data block and the updated parity data block of the first write command, and the user data blocks and the corresponding parity data blocks of the selected write commands can be simultaneously written to different locations of the number of memory devices.

In some embodiments, the first user data block can be a data block (e.g., data blocks 564 and/or 664 illustrated in FIGS. 5 and 6, respectively) that has been stored in a cache (e.g., the cache 212 and/or 412 illustrated in FIGS. 2 and 4, respectively) and not written to the first location yet. In this example, the first user data block that has been stored in the cache can be written to the first location to synchronize the cache and the number of memory devices.

Figure 8:
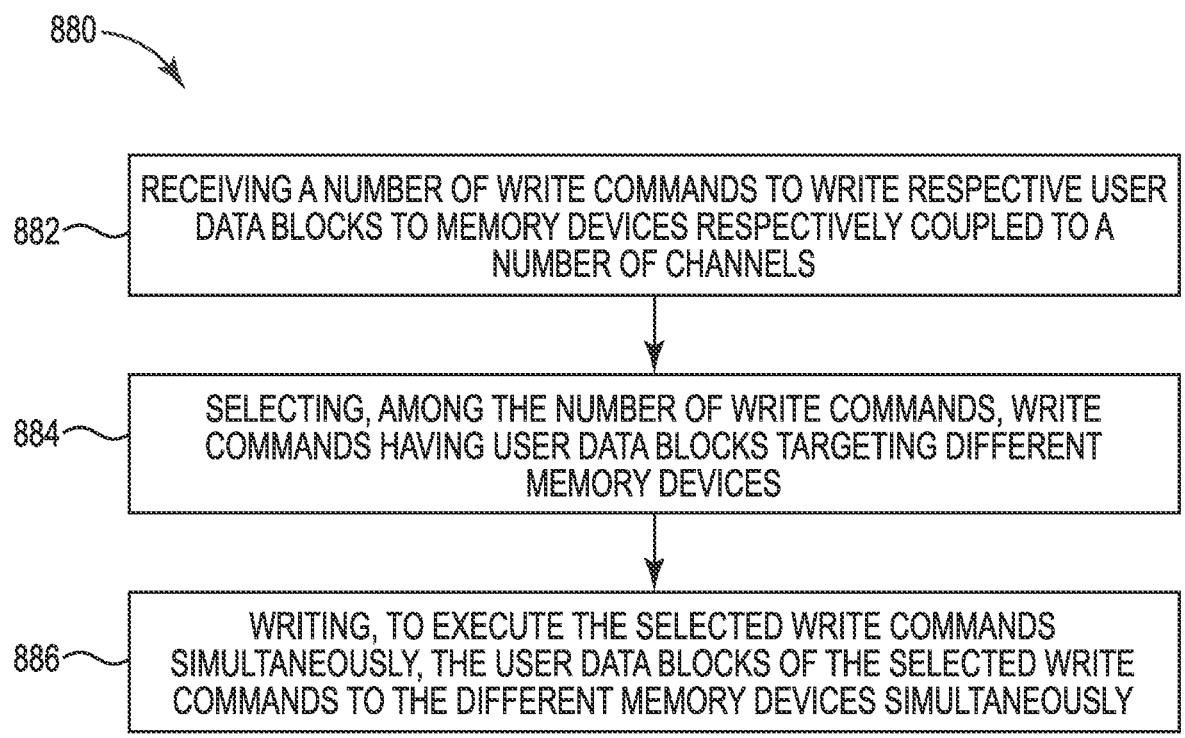
FIG. 8 is a flow diagram of a method for independent execution of write commands in accordance with a number of embodiments of the present disclosure.

FIG. 8 is a flow diagram 880 of a method for independent execution of write commands in accordance with a number of embodiments of the present disclosure. The method 880 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 880 is performed by the memory controller 100 and/or 200 illustrated in FIGS. 1 and 2, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 882, a number of write commands (e.g., host write commands from the host 103 illustrated in FIG. 1) to write respective user data blocks (e.g., a user data block 566-1, 666-1, and/or 666-3 illustrated in FIGS. 5-6, respectively) to memory devices (e.g., the memory devices 126, 226, and/or 526 illustrated in FIGS. 1, 2, and 5, respectively) can be received. Each user data block of the respective user data blocks can correspond to a respective set of data blocks that are grouped together and is a unit of read access. At 884, among the number of write commands, write commands having user data blocks targeting different memory devices can be selected. At 886, to execute the selected write commands simultaneously, the user data blocks of the selected write commands can be written to the different memory devices simultaneously.

In some embodiments, parity data blocks (e.g., a parity data block 566-2, 666-2, and/or 666-4 illustrated in FIGS. 5-6, respectively) respectively corresponding to the sets of data blocks can be retrieved responsive to the number of write commands. The parity data blocks can be updated based at least in part on the respective user data blocks of the number of write commands. In this example, the write commands having the user data blocks and corresponding parity data blocks targeting different memory devices can be selected. Further, in this example, the user data blocks and the corresponding parity data blocks can be written to the different memory devices simultaneously.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
receiving a first write command to write a first user data block corresponding to a first channel coupled to one of a number of memory devices, wherein the first user data block is one of a first set of data blocks that is a unit of read access and whose data blocks are grouped together for an error correction operation;
receiving a second write command to write a second user data block corresponding to a second channel coupled to one of the number of memory devices, wherein the second user data block is one of a second set of data blocks that is a unit of read access and whose data blocks are grouped together for an error correction operation; and
responsive to the first and second write commands:
retrieving a first parity data block corresponding to a third channel and grouped with the first user data block;
updating the first parity data block based at least in part on the first user data block; and
writing the first user data block, the second user data block, and the updated first parity data block simultaneously to memory devices that are respectively coupled to the first, second, and third channels independently of other user data blocks grouped with the first parity data block or the first user data block.

2. The method of claim 1, further comprising, responsive to the first write command: retrieving the other user data blocks grouped with the first user data block from the number of memory devices; and updating the first parity data block based at least in part on the first user data block and the other user data blocks.

3. The method of claim 1, further comprising writing the first user data block and the updated first parity data block to the number of memory devices without writing the other user data blocks back to the number of memory devices.

4. The method of claim 1, further comprising, in response to the second write command:
retrieving a second parity data block corresponding to a fourth channel and grouped with the second user data block;
updating the second parity data block based at least in part on the second user data block; and
write, to one of the number of memory devices coupled to the fourth channel, the second parity data block simultaneously with the first user data block, the first parity data block, and the second user data block.

5. The method of claim 1, wherein the first user data block is a data block that has been stored in a cache and not yet written to the one of the number of memory devices coupled to the first channel; and wherein the method further comprises writing the first user data block that has been stored in the cache to the one of the number of memory devices coupled to the first channel to synchronize the cache and the number of memory devices.

6. An apparatus, comprising: a number of memory devices respectively coupled to a number of channels configured to store sets of data blocks each including respective user data blocks and one or more parity blocks that are grouped together for an error correction operation; and a controller coupled to the number of memory devices and configured to: receive a plurality of write commands to write respective user data blocks to the number of memory devices; retrieve, in response to receipt of the plurality of write commands, parity data blocks respectively corresponding to the user data blocks; update the retrieved parity data blocks based respectively on the user data blocks; and write, among the user data blocks and the updated parity data blocks, at least two user data blocks and one or more parity data blocks targeting different memory devices of the number of memory devices and to the different memory devices.

7. The apparatus of claim 6, wherein:
the controller comprising a cache; and
at least one of plurality of write commands is to write a corresponding user data block from the cache to a respective memory device of the number of memory devices to synchronize the cache and the respective memory device of the number of memory devices.

8. The apparatus of claim 6, wherein each memory device of the number of memory devices is configured for a single parity data block such that parity data blocks of the sets of data blocks are distributed across different memory devices of the number of memory devices.

9. The apparatus of claim 6, wherein each memory device of the number of memory devices is configured for a single user data block of each set of the sets of data blocks such that user data blocks of each set are distributed across different memory devices of the number of memory devices.

10. The apparatus of claim 6, wherein the controller is configured to access one of the number of memory devices independently of and simultaneously with other memory devices of the number of memory devices.

11. A method, comprising:
receiving a number of write commands to write respective user data blocks to memory devices respectively coupled to a number of channels, wherein each user data block of the respective user data blocks corresponds to a respective set of data blocks that is a unit of read access and whose data blocks are grouped together for an error correction operation;
selecting, among the number of write commands, write commands having user data blocks targeting different memory devices; and
writing, to execute the selected write commands simultaneously, the user data blocks of the selected write commands to the different memory devices simultaneously.

12. The method of claim 11, further comprising:
retrieving, responsive to the number of write commands, parity data blocks, wherein each of the parity data blocks corresponds to the respective set of data blocks; and
updating the parity data blocks based at least in part on the respective user data blocks of the number of write commands.

13. The method of claim 12, wherein selecting the write commands having the user data blocks targeting different memory devices further comprises selecting the write commands having the user data blocks and corresponding parity data blocks targeting different memory devices.

14. The method of claim 13, wherein writing the user data blocks of the selected write commands to the different memory devices simultaneously further comprises writing the user data blocks and the corresponding parity data blocks to the different memory devices simultaneously.

15. An apparatus, comprising:
a number of memory devices respectively coupled to a number of channels; and
a controller coupled to the number of memory devices; the controller configured to:
receive a number of write commands; and
responsive to receipt of the number of write commands:
update parity data blocks respectively corresponding to user data blocks of the number of write commands;
select, among the number of write commands, write commands having user data blocks and respective parity data blocks targeting different memory devices among the number of memory devices;
write the user data blocks and the respective parity data blocks of the selected write commands to the different memory devices simultaneously.

16. The apparatus of claim 15, wherein the controller is configured to prevent from selecting, among the number of write commands, at least two write commands targeting a same memory device of the number of memory devices.

17. The apparatus of claim 15, wherein the number of memory devices are configured for sets of data blocks, wherein each set is a unit of read access and includes data blocks that are grouped together for an error correction operation.

18. The apparatus of claim 17, wherein the user data blocks of the selected write commands correspond to different sets of data blocks.

19. The apparatus of claim 17, wherein parity data blocks of the sets of data blocks are distributed across different memory devices of the number of memory devices.

20. The apparatus of claim 15, wherein the user data blocks and the respective parity data blocks of the selected write commands are written to the different memory devices as part of performance of a cache write back.

* * * * *